United States Patent [19]

Joensuu et al.

[11] Patent Number: 5,878,347
[45] Date of Patent: Mar. 2, 1999

[54] ROUTING A DATA SIGNAL TO A MOBILE STATION WITHIN A TELECOMMUNICATIONS NETWORK

[75] Inventors: Erkki Joensuu; Mahesh Patel, both of Plano, Tex.

[73] Assignee: Ericsson, Inc., Research Triangle Park, N.C.

[21] Appl. No.: 655,088

[22] Filed: Jun. 3, 1996

Related U.S. Application Data

[60] Provisional application No. 60/014,238, Mar. 26, 1996.

[51] Int. Cl.⁶ .................................................. H04Q 7/20
[52] U.S. Cl. .......................... 455/433; 455/432; 455/445; 455/466
[58] Field of Search .................................. 455/433, 33.1, 455/432, 445, 466; 379/59, 58; 370/401

[56] References Cited

U.S. PATENT DOCUMENTS

| | | | |
|---|---|---|---|
| 4,310,727 | 1/1982 | Lawser | 179/18 B |
| 4,754,479 | 6/1988 | Bicknell et al. | 379/207 |
| 5,237,604 | 8/1993 | Ryan | 379/220 |
| 5,247,571 | 9/1993 | Kay et al. | 379/207 |
| 5,251,248 | 10/1993 | Tokunaga et al. | 379/58 |
| 5,400,390 | 3/1995 | Salin | 379/59 |
| 5,422,941 | 6/1995 | Hasenauer et al. | 379/207 |
| 5,423,068 | 6/1995 | Hecker | 455/56.1 |
| 5,442,683 | 8/1995 | Hoogeveen | 379/60 |
| 5,455,855 | 10/1995 | Hokari | 379/229 |
| 5,457,736 | 10/1995 | Cain et al. | 379/60 |
| 5,481,603 | 1/1996 | Gutierrez et al. | 379/221 |
| 5,504,804 | 4/1996 | Widmark et al. | 379/63 |
| 5,526,400 | 6/1996 | Nguyen | 455/445 |
| 5,579,372 | 11/1996 | Astrom | 455/412 |
| 5,590,398 | 12/1996 | Matthews | 455/433 |
| 5,594,942 | 1/1997 | Antic et al. | 455/432 |
| 5,689,548 | 11/1997 | Maupin | 455/466 |
| 5,706,286 | 1/1998 | Reiman et al. | 370/401 |
| 5,711,002 | 1/1998 | Foti | 455/417 |

FOREIGN PATENT DOCUMENTS

| | | | |
|---|---|---|---|
| 0512962 | 1/1992 | European Pat. Off. | H04Q 7/04 |
| WO 9512292 | 5/1995 | WIPO | H04Q 7/22 |
| WO 9611557 | 4/1996 | WIPO | H04Q 7/38 |

OTHER PUBLICATIONS

Generic Switching and Signaling Requirements for Number Portability J.J. Lichter, AT&T Network Systems, Generic Requirements, Issue 1.00 Feb. 2, 1996 –pp. 1–75.

*PCS Number Portability,* by Arthur Giordano and May Chan GTE Laboratories, Inc., 40 Sylvan Road, Waltham, MA 02254.

*Freeing the Network for Competition,* by Tim Bishop Telecommunications, Apr. 1995, vol. 29, No. 4.

*A Hashing Scheme for Phone Number Portability in PCS Systems with ATM Backbones* by Ravi Jain, Subhashini Rajagopalan and Li–Fung Chang Applied Research, Bell Communications Research, IEEE, 1996.

*Phone Number Portability for PCS Systems with ATM Backbones Using Distributed Dynamic Hashing* by Ravin Jain, Member, IEEE, Subhashini Rajagopalan, and Li Fung Chang, Senior Member, IEEE IEEE Journal on Selected Areas in Communications, vol. 15, No. 1, Jan. 1997.

*Primary Examiner*—Edward F. Urban
*Assistant Examiner*—Tilahun Gesesse
*Attorney, Agent, or Firm*—Jenkens & Gilchrist

[57] ABSTRACT

Incoming calls or messages for a mobile station that has been ported from a first HLR to a second HLR are first received by a gateway node. The gateway node, in turn, transmits a signal requesting routing instruction to a centralized database connected to a gateway node. Utilizing the received Mobile Station Integrated Services Digital Network (MSISDN) number, the centralized database determines the network address of the new HLR currently serving the ported mobile station. The received signal requesting routing information is then routed to the new HLR. The new HLR retrieves the requested information and transmits it back to the gateway node. The gateway node, utilizing the received routing information received from the new HLR, accordingly routes the incoming calls or messages to the ported mobile station.

39 Claims, 10 Drawing Sheets

ROUTING A DATA SIGNAL TO A MOBILE STATION WITHIN A TELECOMMUNICATIONS NETWORK

PRIORITY UNDER 35 U.S.C. § 109(e) & 37 C.F.R. § 1.78(a)(1)

This nonprovisional application claims priority based upon a prior U.S. Provisional Patent Application entitled "Routing A Data Signal To A Mobile Station Within A Telecommunications Network", Ser. No. 60/014,238, filed Mar. 26, 1996, in the names of Erkki Joensuu, Mahesh Patel, and Gung-Shih Chien.

CROSS REFERENCES TO RELATED APPLICATIONS

This nonprovisional U.S. patent application contains subject matter related to copending Nonprovisional U.S. patent application Ser. No. 08/656,723, entitled "Routing An Incoming Call To A Ported Mobile Station Within A Telecommunications Network", filed Jun. 3, 1996 (Attorney Docket No. 27943-00065), hereby incorporated by reference herein.

BACKGROUND OF THE INVENTION

Technical Field of the Invention

The present invention relates to a telecommunications network system and, in particular, to the routing of a data signal to a mobile station relocated from a first home location register to a second home location register.

Description of Related Art

Within the Global System for Mobile (GSM) Communication or the Personal Communications System (PCS), each mobile station is assigned a unique identification number known as a Mobile Station Integrated Services Digital Network (MSISDN) number. A MSISDN number is dialed whenever a caller wants to communicate with a particular mobile station. The telecommunications network, by analyzing a part of the dialed MSISDN number, determines the associated home location register (HLR) which serves that particular mobile station and stores routing information identifying the mobile switching center (MSC) currently serving the mobile station. By retrieving and utilizing such routing information, the telecommunications network is able to locate the mobile station in response to an incoming call for establishing a speech connection between the incoming caller and the mobile station.

Mobile subscribers often want to relocate from a first service area served by a first HLR to a second service area served by a second HLR. By relocating, a particular mobile station's pre-existing subscriber agreement with the first HLR is terminated and a new subscription agreement with the second HLR is established. However, specific series of MSISDN numbers are pre-assigned to each HLR. By relocating from one HLR to another, the mobile station accordingly must be assigned a new MSISDN number pre-assigned to the new second HLR. Changing the assigned MSISDN number is a cumbersome process in part because the mobile subscriber has to take his mobile station in for service and also inconveniently notify all relevant parties of his new MSISDN number (directory number). Accordingly, there is a need for a scheme which would enable a mobile station to relocate from a first HLR to a second HLR without having to change the assigned MSISDN number.

SUMMARY OF THE INVENTION

The present invention provides a method and apparatus for transporting a telecommunications data signal to a mobile station relocated from a first home location register (HLR) to a second HLR. Such a data signal includes an incoming voice data signal and a Short Message Service (SMS) data signal. A network address representing an HLR associated with a mobile station and a mobile identification number associated with that mobile station are correlated and stored in a centralized database. Whenever an incoming data signal is received by a gateway node within the telecommunications network, a signal requesting routing information for that data signal is transmitted to the centralized database instead of to the serving HLR. The centralized database retrieves the network address of the HLR associated with that given mobile station and reroutes the request signal to the associated HLR. Upon receipt of the request signal, the associated HLR retrieves and transmits the routing instruction indicating the network address of the mobile switching center (MSC) currently serving that given mobile station back to the gateway node. The gateway node receives the routing information and routes the data signals to the serving MSC for transportation to the given mobile station.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
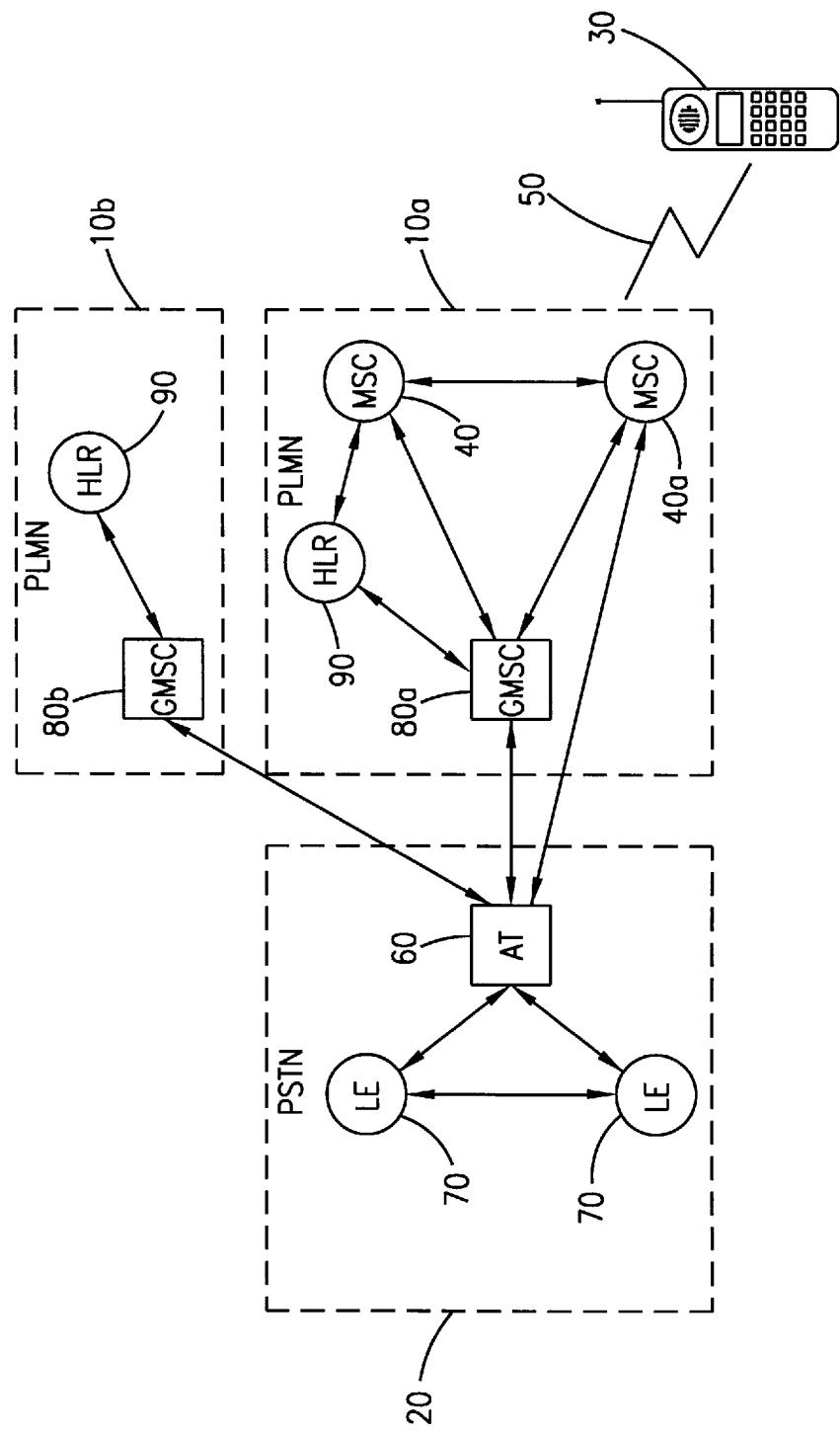
FIG. 1 is a block diagram illustrating the network interconnection of multiple Public Land Mobile Networks (PLMN) to a Public Switched Telephone Network (PSTN)

FIG. 1 is a block diagram illustrating the network interconnection of multiple Public Land Mobile Networks (PLMN) 10 to a Public Switched Telephone Network (PSTN) 20. A mobile station 30 (also known as a mobile terminal or equipment) is associated with one of the PLMNs 10 as the Home PLMN 10a. Within each PLMN 10, there are a number of different mobile switching centers (MSC) 40 servicing the geographic area covered by the network. A mobile station 30 communicates with one of the MSCs 40 via over-the-air communications links 50. The mobile station 30 served by one PLMN 10 then communicates with other wireline and wireless terminals by connecting to the PSTN 20. The access tandem (AT) 60 within the PSTN 20 routes the mobile calls generated from the one PLMN 10 to wire-line terminals serviced by one of its local exchanges (LE) 70 within the PSTN 20, or to another PLMN 10 by a way of its gateway mobile switching center (GMSC) 80.

For an incoming call intended for the mobile station 30, the incoming call is first routed to the GMSC 80a serving the home PLMN 10a. The GMSC 80a sends a signal requesting routing information to the home location register (HLR) 90 for that mobile station 30. The HLR 90 (which stores subscriber information and keeps track of the current location of the mobile station 30) then requests a roaming number from the MSC currently serving the mobile station 30. The requested roaming number is subsequently received by the HLR and returned to the GMSC 80a. The returned routing instruction includes a network address indicating which MSC 40 (for example, MSC 40a) is currently serving the mobile station 30. Upon receipt of such routing information, the GMSC 80a transmits the incoming call to the serving MSC 40a. The serving MSC 40a then establishes a speech connection with the mobile station 30 located with its MSC serving area.

With the development of the Global System for Mobile (GSM) communications and the Personal Communications System (PCS), a number of advanced supplementary services have been introduced. One example is the Short Message Service (SMS) system for transmitting alphanumeric characters between an SMS operator and a mobile station. Once the SMS messages transporting the alphanumeric characters are received by the mobile station, the character data are written into a buffer within a Subscriber Identity Module (SIM card) attached to the mobile station. Such SIM card stored data can later be displayed or manipulated for further application by the subscriber.

Figure 2:
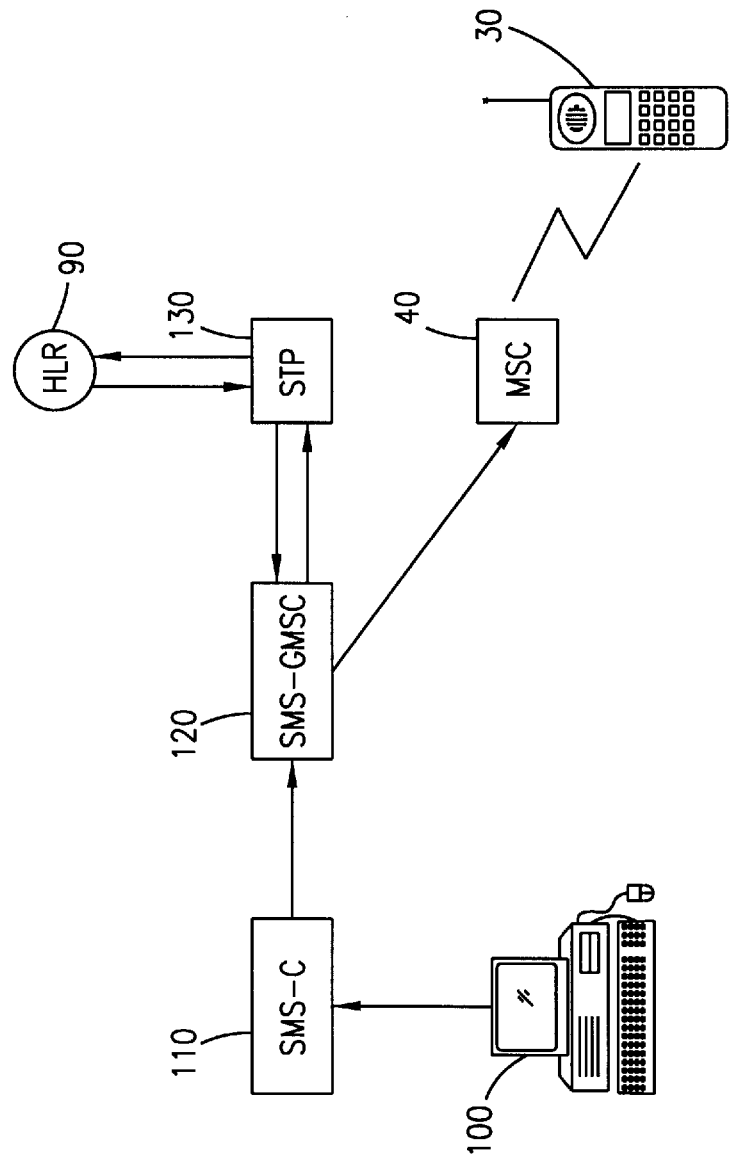
FIG. 2 is a block diagram illustrating the communication of a Short Message Service (SMS) message between an SMS operator and a mobile station.

Reference is now made to FIG. 2 where a block diagram illustrating the communication of a Short Message Service (SMS) message between an SMS operator 100 and a mobile station 30 is shown. The SMS operator 100 sends a string of alphanumeric characters to the Short Message Service Center (SMS-C) 110 to be transmitted to the mobile station 30. The SMS-C 110 encapsulates the character data into an SMS message and routes the SMS message to a Short Message Service—Gateway Mobile Switching Center (SMS-GMSC) 120. In a manner similar to the operation of the GMSC with respect to incoming voice calls, the SMS-GSMC 120 interrogates the HLR 90 for routing information (where the mobile station 30 is currently located) via a Signal Transfer Point (STP) 130. After receiving the requested routing information from the HLR 90, the SMS-GMSC 120 subsequently routes the message to the MSC 40 serving the mobile station's current location. The mobile station 30 is paged and a connection is set up between the mobile station 30 and the network, as in the normal call setup case of FIG. 1. However, if the mobile station 30 is already busy, the paging is not performed because the network already knows that the mobile station is accessible. If the connection has been successful, and thereby the mobile station 30 authenticated, the MSC 40 delivers the SMS message to the mobile station 30 over one of the control data channels. A control data channel such as a Stand-alone Dedicated Control Channel (SDCCH) is used instead of a traffic channel (TCH) to allow connection-less data communications. After receiving the SMS message encapsulating the character data, the mobile station 30 acts merely as a buffer and passes the data to the attached SIM card (not shown in FIG. 2) for storing in a buffer or memory device. Lastly, if the delivery has been successful, a successful delivery report is sent from the MSC 40 to the SMS-C 110. Otherwise, a failure report is generated.

With the continuing development in the mobile telecommunications technology and the increasing number of mobile subscribers, an innovative concept called "number portability" is becoming popular. The number portability concept allows a mobile subscriber to relocate or "port" from an existing service area to a new PLMN area or HLR area without changing the mobile subscriber's assigned MSISDN number or directory number. By not changing the assigned MSISDN number, the mobile subscriber need not have his mobile station manually serviced to encode a new MSISDN number. The mobile subscriber also need not inconveniently notify his friends and associates of his new MSISDN number.

Number portability also allows more efficient usage and better management of the network resources. If a PLMN comprises a number of HLRs, and the work load or capacity is unevenly distributed across the network, it would be advantageous to transfer some of the subscription agreements or subscriber information from one of the HLRs with overloaded capacity to another HLR with lesser load without changing the MSISDN numbers assigned to the associated mobile stations. By reallocating some of the subscriber information and evenly distributing the work load, the PLMN is better able to manage its resources and work-load.

Figure 3:
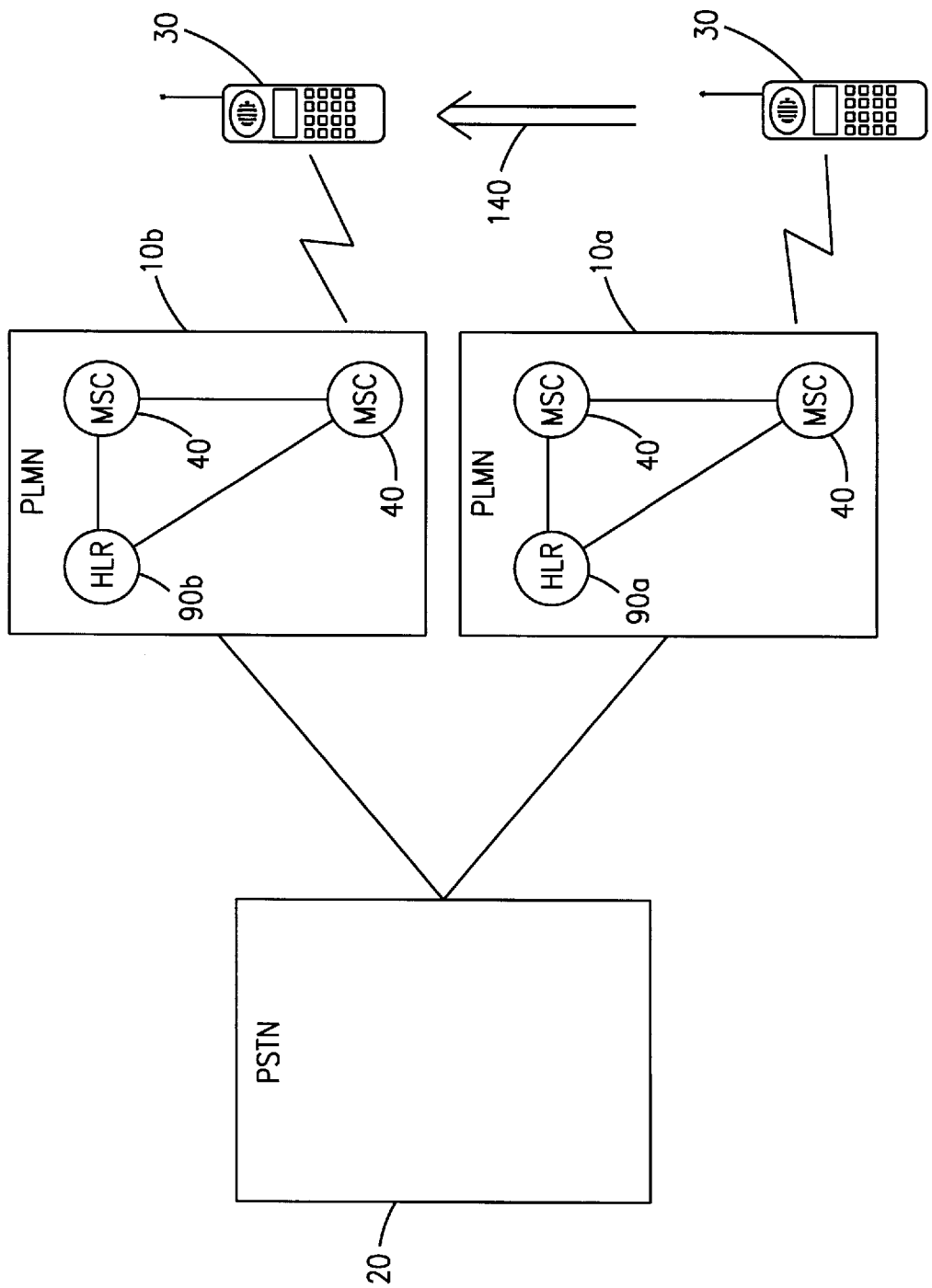
FIG. 3 illustrates a mobile station relocating from a first home location register (HLR) associated with a first PLMN to a second HLR associated with a second PLMN.

Reference is now made to FIG. 3 where a mobile station 30 associated with a first HLR 90a within a first PLMN 10a is shown relocating or porting 140 to a second HLR 90b within a second PLMN 10b (an inter-PLMN number portability). The mobile station 30 is initially registered with the PLMN 10a as the home PLMN. All incoming calls either from the PSTN 20 or another PLMN 10b are received by the GMSC (not shown in FIG. 3, see FIG. 1) within the PLMN 10a and accordingly routed to the serving MSC 40. As described previously, the GSMC properly routes an incoming call to the serving MSC 40 because the dialed MSISDN number includes a value indicative of which HLR within the home PLMN 10a is storing the requisite subscriber information. Consequently, the GMSC analyzes the received MSISDN number, determines the appropriate HLR, requests routing information from the determined HLR, and then routes the incoming call to the appropriate MSC.

The mobile station 30 terminates his subscription agreement with the existing HLR 90a and registers with the new HLR 90b within the new PLMN 10b without changing his MSISDN number. However, because the MSISDN number has not been changed to reflect the new HLR 90b and the new PLMN 10b, all future incoming calls are still routed to the old PLMN 10a. The GSMC within the PLMN 10a is not able to reroute the received incoming calls to the relocated mobile station 30 because the GMSC is no longer able to determine the correct HLR storing the subscriber information by merely analyzing the received MSISDN number.

Figure 4:
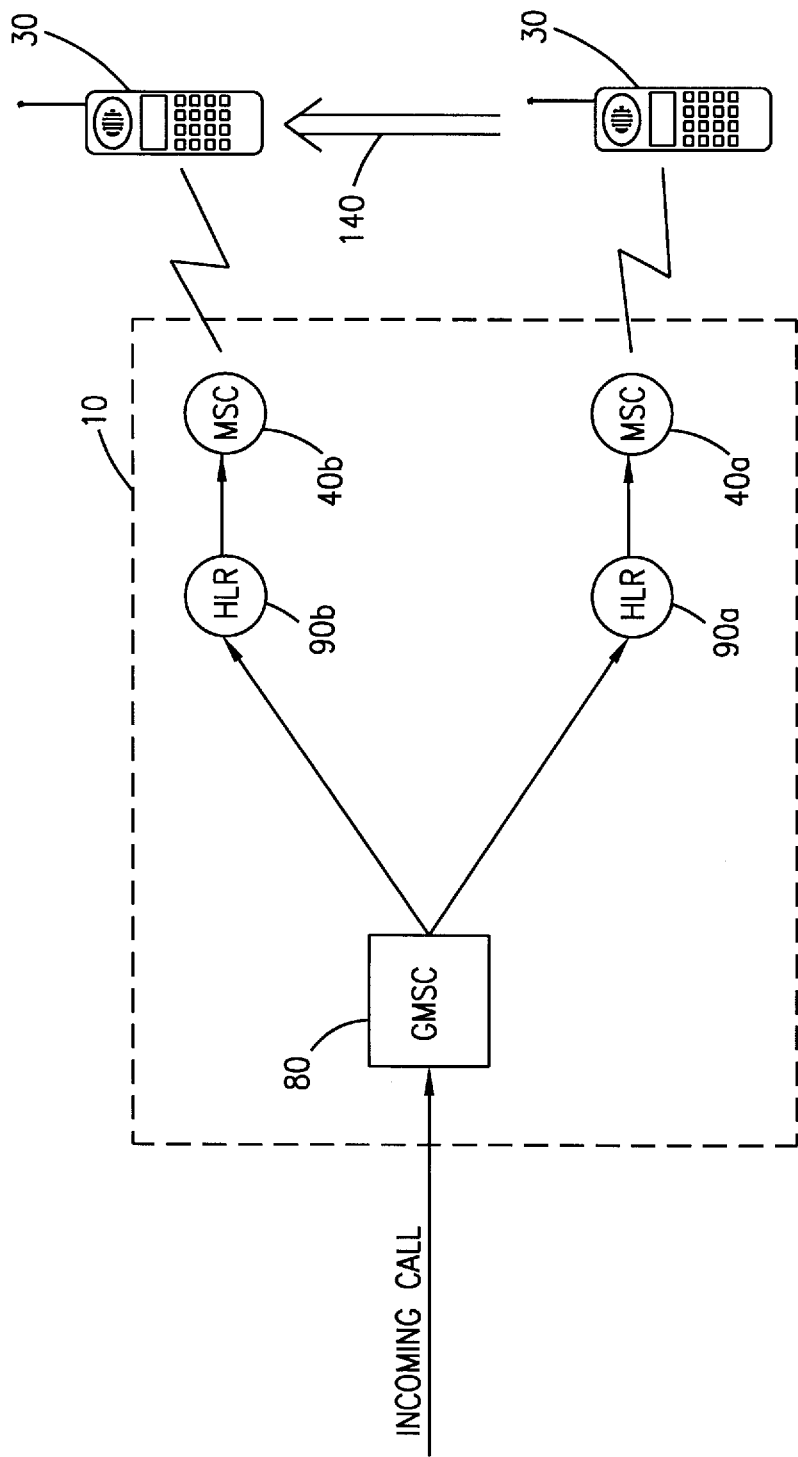
FIG. 4 illustrates a mobile station relocating from a first home location register (HLR) to a second HLR within the PLMN.

FIG. 4 further illustrates a mobile station 30 relocating 140 from a first HLR 90a to a second HLR 90b within the same PLMN 10 (an intra-PLMN number portability) where the above problem of not locating the correct HLR 90 still exists. If the mobile station 30 relocates from a service area served by an MSC 40a closely associated with the HLR 90a to a service area served by an MSC 40b closely associated with the HLR 90b, it is efficient to register the mobile station 30 with the closer HLR 90b to minimize the signaling time and distance between the mobile station 30 and its associated HLR. Furthermore, as described previously, if the PLMN 10 has a number of HLRs 90 with unevenly distributed work load, the telecommunications network performs much more efficiently when some of the subscriber information are transferred over to a lesser used HLR for maximized use of the network resources. However, because of the unaltered MSISDN number, the GMSC 90 is still requesting routing information from the old HLR 90a when the mobile station 30 has already been ported to the new HLR 90b. As a result, incoming calls are not properly routed to the mobile station 30. Accordingly, there is a need for a separate mechanism to reroute incoming signals towards the new HLR serving a ported mobile station.

Figure 5:
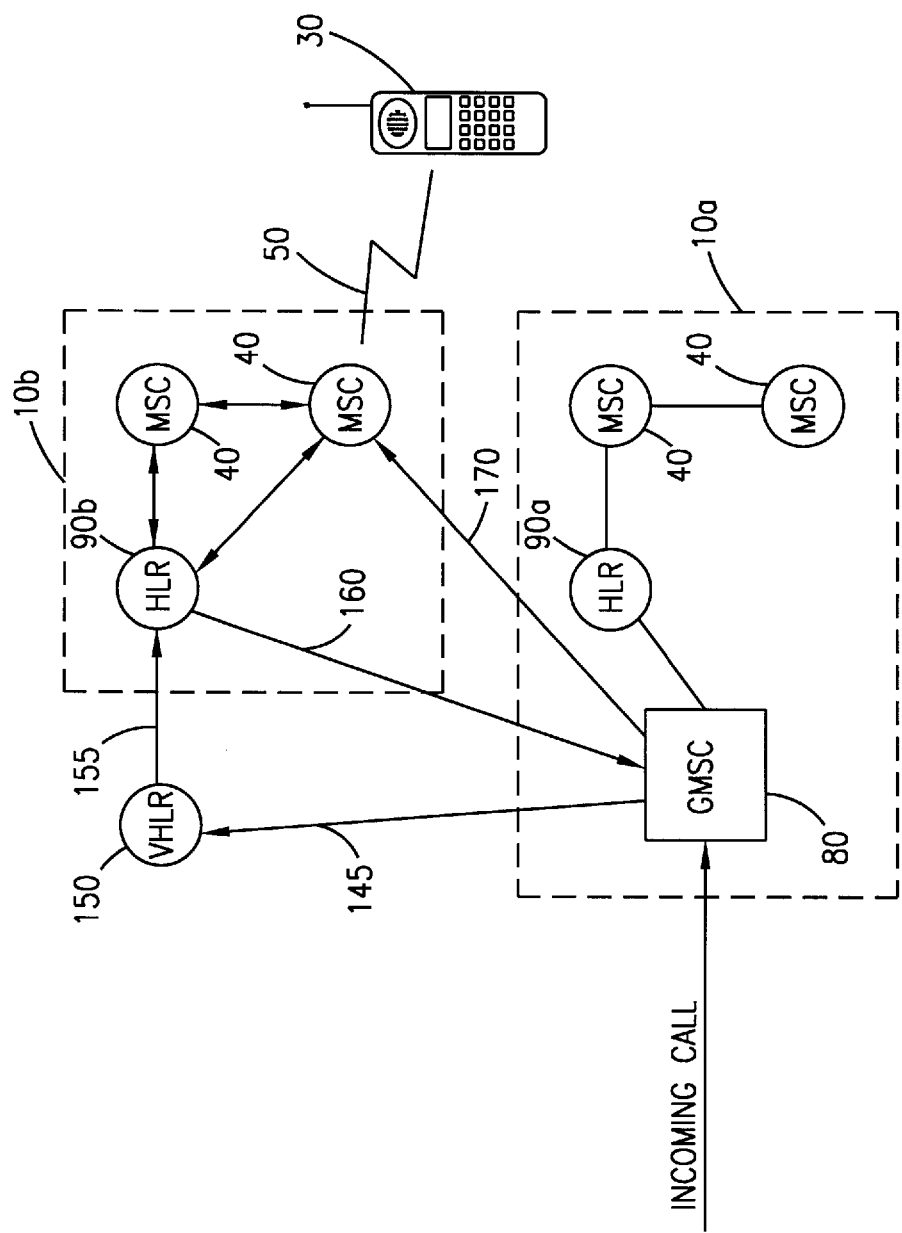
FIG. 5 is a block diagram illustrating a virtual home location register (VHLR) communicating with a gateway mobile switching center (GMSC) for rerouting incoming signals to a relocated mobile station.
Figure 6:
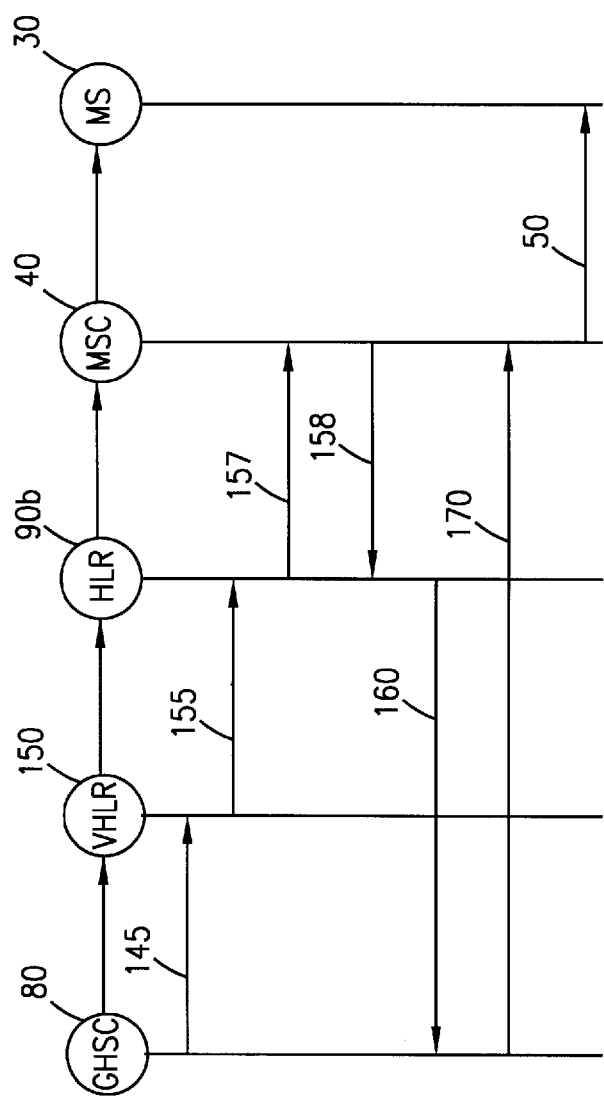
FIG. 6 is a signal sequence diagram for illustrating a virtual home location register (VHLR) communicating with a gateway mobile switching center (GMSC) for rerouting incoming signals to a relocated mobile station.

In accordance with the teachings of the present invention, reference is now made to both FIGS. 5 and 6 illustrating the use of a virtual home location register (VHLR, centralized database) 150 communicating with a gateway mobile switching center (GMSC) 80 for rerouting incoming signals to a relocated mobile station 30. The mobile station 30 used to be associated with the PLMN 10a by having its subscriber information stored in the HLR 90a. Since its MSISDN number is one of the series of numbers assigned to the HLR 90a, an incoming call is automatically first routed to the GMSC 80 within the PLMN 10a. The GMSC 80 transmits a routing information request signal 145 to the VHLR 150 in accordance with the teachings of the present invention instead of to the home HLR as in the prior art. The VHLR 150 can be associated independently from any particular PLMN 10 and be provided and maintained by a third party operator to service the inter-PLMN number portability as shown in FIG. 5. By looking up its correlation table using the received MSISDN number, the VHLR 150 is able to determine the network address of the HLR 90b currently serving the mobile station 30. Since the VHLR 150 is interfaced directly on top on the Signal Connection Control Point (SCCP) layer of the Signaling System No. 7 (SS7) telecommunications protocol, there is no need for the VHLR 150 to alter the originating point code (OPC) or Global Title (GT) address. Only the destination point code (DPC) or GT address is modified to represent the new home HLR 90b. No other parameters or contents are altered by the VHLR 150. Moreover, since the VHLR 150 is implemented as an SCCP user and has functions to translate a given MSISDN number to the corresponding HLR address, the VHLR can be placed in any node that has the Message Transfer Part (MTP) layer and the SCCP layer capabilities such as a signal transfer point (STP) or GMSC.

The routing instruction request signal is then rerouted from the VHLR 150 to the HLR 90b (signal 155) by changing the appropriate SCCP destination address. The HLR 90b then retrieves and transmits the requested routing information back to the GMSC 80 via a signal 160. As described previously, the HLR 90b requests and receives a roaming number from the serving MSC 40 (signal links 157–158). The routing information received from the serving MSC can be transmitted directly from the HLR 90b to the GMSC 80 without going through the VHLR 150 because the OPC or GT address still represents the GMSC 80. Using the received routing information, the GMSC 80 routes the incoming call to the MSC 40 serving the mobile station 30 via a signal 170. The MSC 40 then pages the mobile station 30 and establishes a speech connection between the incoming caller and the mobile station 30 over a radio link 50. Accordingly, by maintaining a separate centralized database for storing data correlating each mobile station's MSISDN number with its associated HLR network address, a mobile station can freely register with a new HLR without altering his MSISDN number.

Figure 7:
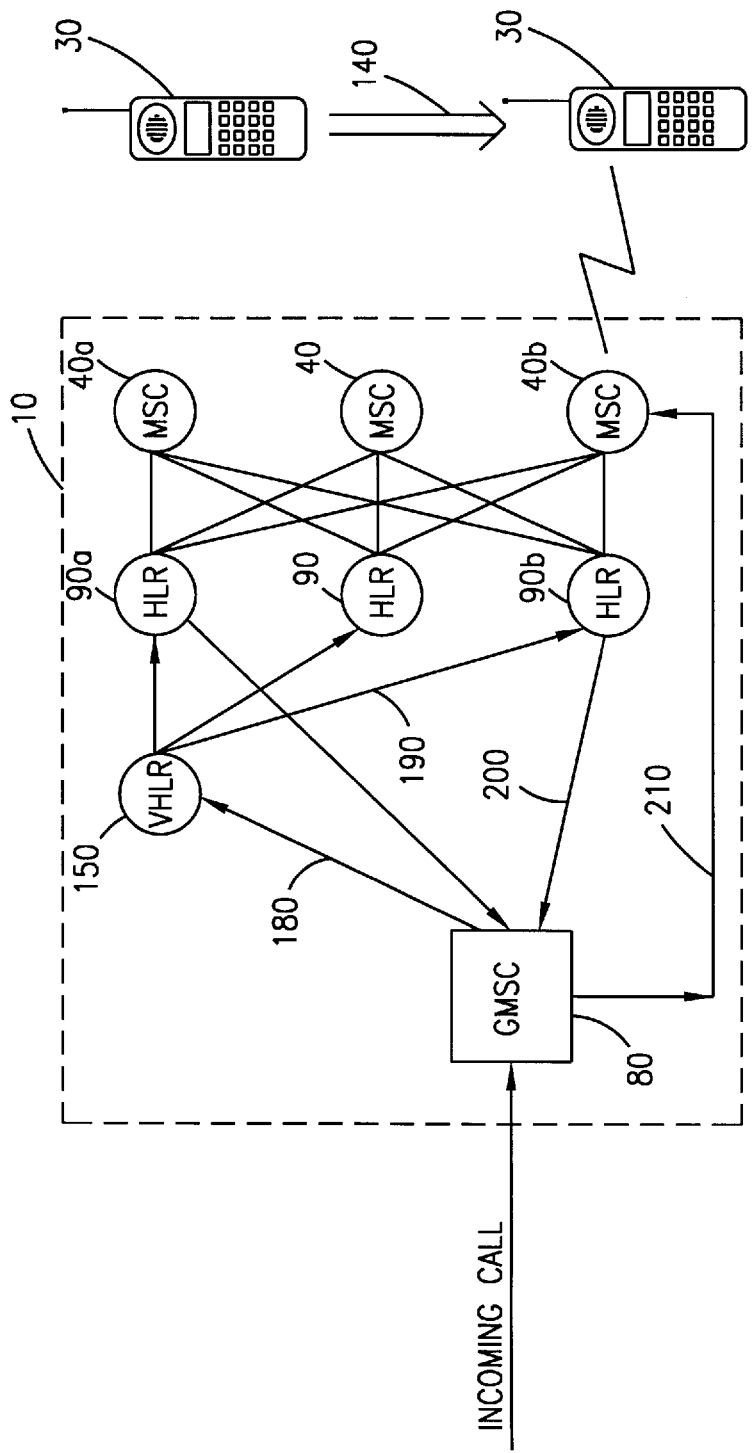
FIG. 7 is a block diagram illustrating a VHLR routing incoming signals to a mobile station that has been relocated from a first HLR to a second HLR within the same PLMN.

The VHLR 150 can further be utilized within a single PLMN to provide better management of the network resources. Reference is now made to FIG. 7 where a block diagram illustrating a VHLR 150 routing incoming signals to a mobile station 30 that has been relocated from a first HLR 90a to a second HLR 90b within the same PLMN 10 is shown. As an illustration, the HLR 90a serving more populated geographic areas may serve a majority of the subscriber information while the HLR 90b with the exact same system capacity may serve only a small portion of the overall network capacity. In order to more evenly distribute the work load, the PLMN 10 transfers some of the subscriber information from the HLR 90a to the HLR 90b. By distributing the work load without changing the MSISDN numbers assigned to the transferred mobile subscribers, the PLMN 10 can better utilize and manage its network resources without inconveniencing the mobile subscribers.

The mobile subscriber may also relocate from a first geographic area served by a MSC 40a to a second geographic area served by a MSC 40b within the same PLMN 10 (as illustrated by the move 140). Even though each MSC 40 within the PLMN 10 has access to any one of the HLRs 90, certain MSCs are located closer to a particular HLR than the rest. By transferring the mobile subscriber's subscriber information to the HLR located closer to the new MSC, the PLMN 10 can reduce the access time for signal and data transfer.

Accordingly, when an incoming call is received by the GMSC 80, the GMSC 80 transmits a signal 180 requesting routing information to the VHLR 150 within its own PLMN 10. The VHLR 150 determines the network address representing the HLR 90b currently serving the mobile station 30 and reroutes the request signal 190 to the HLR 90b. The HLR 90b retrieves and transmits the requisite subscriber information from its database to the GMSC 80 via a signal 200. Utilizing the received routing information, the GMSC 80 routes the incoming call to the MSC 40b serving the geographic area the mobile station is currently located via a signal 210. The MSC 40b in turn establishes a speech connection with the mobile station 30 using a traffic channel (TCH).

Figure 8:
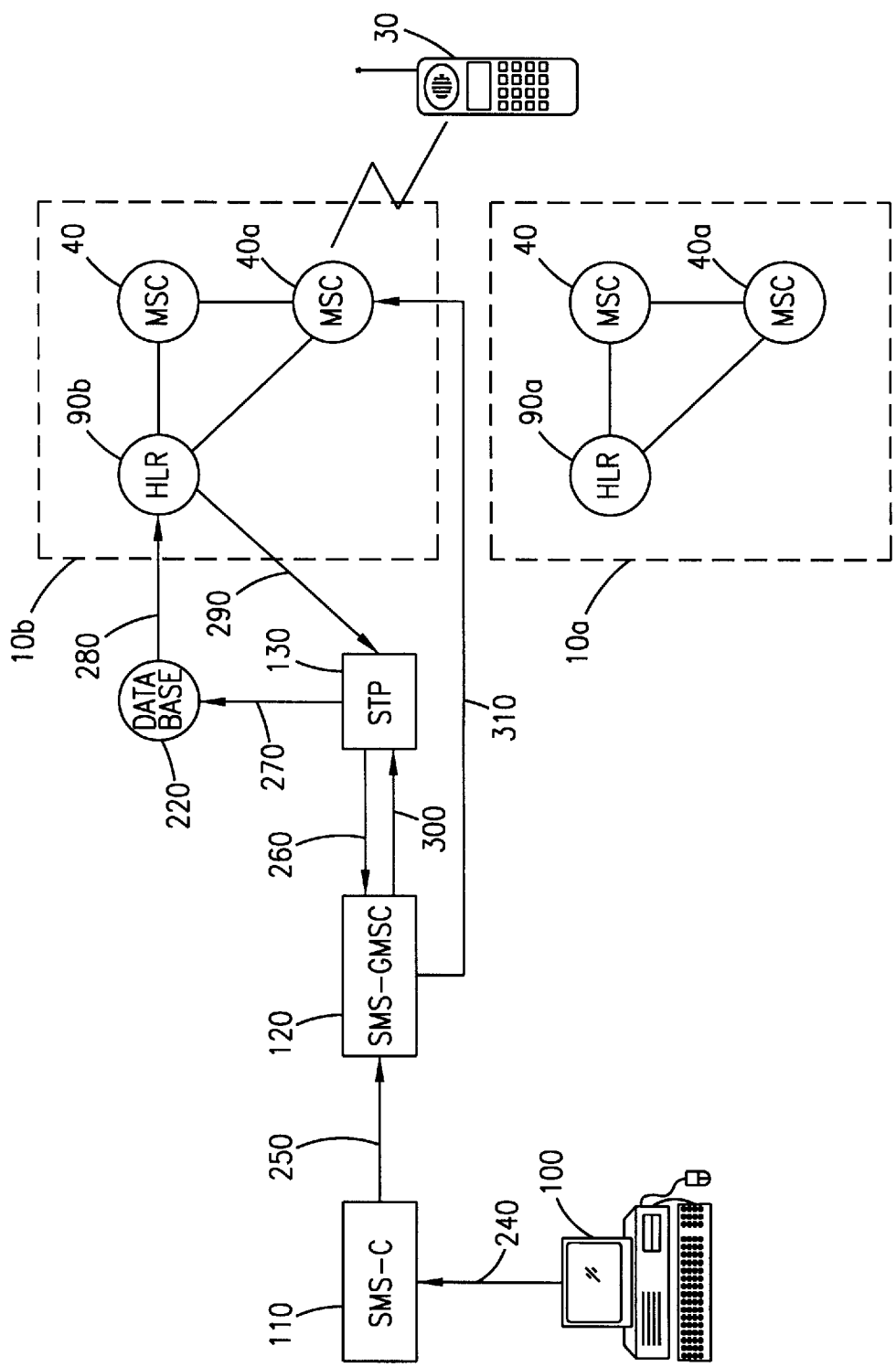
FIG. 8 is a block diagram illustrating a centralized database communicating with a Short Message Service—Gateway Mobile Switching Center (SMS-GMSC) for rerouting an incoming SMS data to a relocated mobile station.
Figure 9:
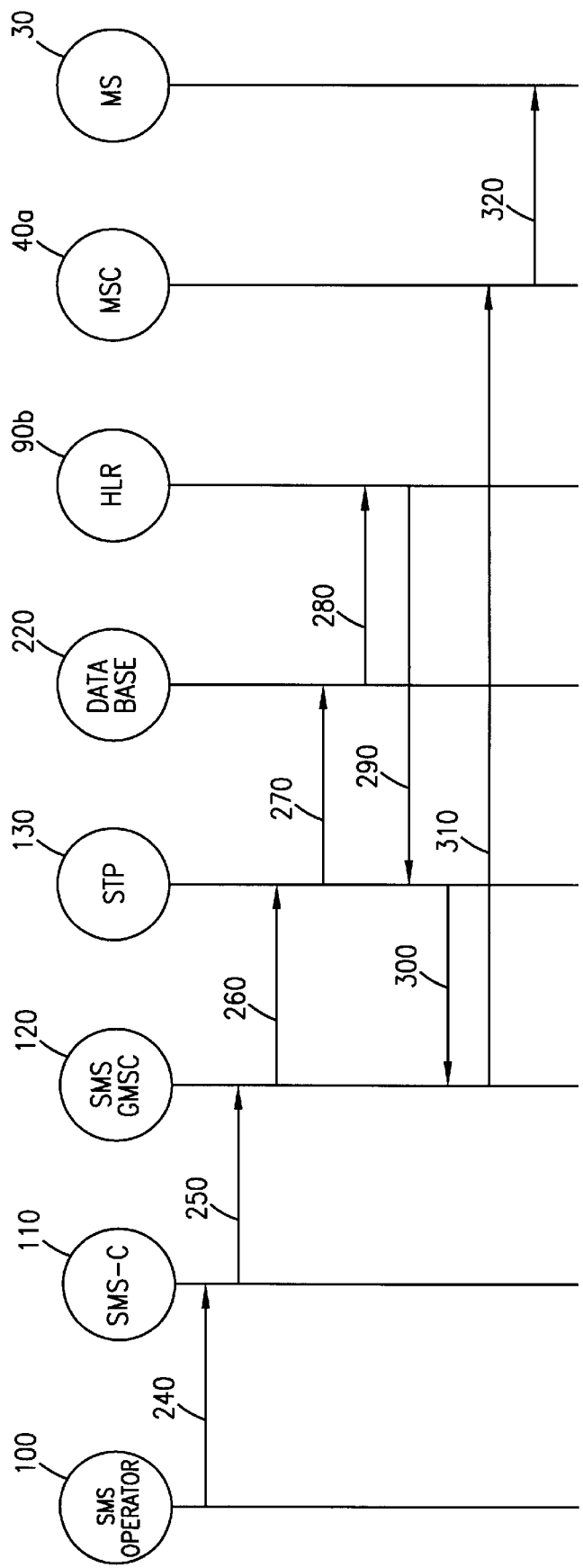
FIG. 9 is a signal sequence diagram illustrating a centralized database communicating with an SMS-GMSC for rerouting an incoming SMS data to a relocated mobile station.

Now reference is made to both FIGS. 8 and 9 where a centralized database 220 communicating with a Short Message Service—Gateway Mobile Switching Center (SMS-GMSC) 120 for routing an incoming SMS data to a ported mobile station 30 is shown. As described in FIG. 2, unlike incoming voice calls, SMS signals are first received by the SMS-GMSC 120 who in turn determines the appropriate HLR address and reroutes the received data to the mobile station 30. The SMS operator 100 sends a string of alphanumeric characters to the Short Message Service Center (SMS-C) 110 to be transmitted to the mobile station 30 via a signal 240 such as an X.25 packet. The SMS-C 110 encapsulates the character data to an SMS message and routes the message to an SMS-GMSC 120 via a signal 250. Similar to the GMSC in FIG. 5 for handling incoming voice calls in accordance with the teachings of the present invention, the SMS-GMSC 120 sends a signal requesting routing instruction to the centralized database 220 via a signal 260 if the translation type (TT) assigned to the received data has the value of ten (10). The SCCP TT parameter value is assigned by the SMS operator 100 when transmitting the alphanumeric characters to the SMS-C 110. The SCCP TT parameter value of ten indicates that this message is intended for a mobile station which could have been ported from one HLR to another. Therefore, the SMS-GMSC 120 routes the request signal to the centralized database 220 instead of the HLR 90a as indicated by the received MSISDN number. The actual request signal may go through a number of STPs 130 who in turn redirect the request signal to the centralized database 220 (signal 270). The centralized database 220 determines the network address representing the HLR 90b currently serving the mobile station 30 and reroutes the request signal to the HLR 90b (signal 280). The HLR 90b retrieves and transmits the requested subscriber information from its database back to the SMS-GMSC 120 via a signal 290. The return signal may also go through a number of STPs 130 (signal 300). Utilizing the received routing instruction, the SMS-GMSC 120 routes the incoming SMS data to the MSC 40a serving the geographic area the mobile station 30 is currently located (signal 310). The MSC 40a, in turn, transports the SMS message 320 to the mobile station 30 via one of the control data channels such as a Stand-alone Dedicated Control Channel (SDCCH).

Figure 10:
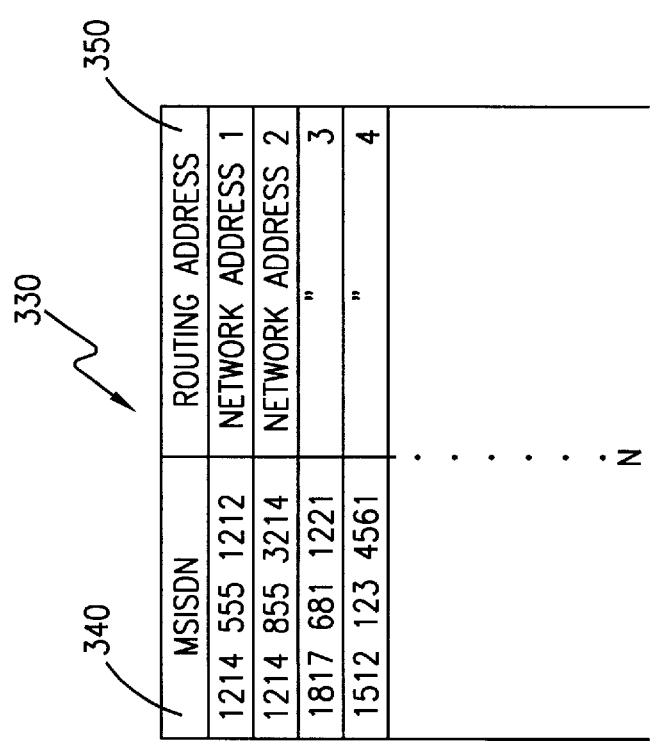
FIG. 10 is a block diagram illustrating the data structure of a database table for correlating a mobile identification number representing a mobile station with a network address for the associated HLR.

FIG. 10 is a block diagram illustrating an exemplary data structure of a database table 330 within a centralized database such as the VHLR 150. The database table 330 is for correlating a mobile identification number 340 such as an MSISDN number representing a particular mobile station with a network address 350 identifying the associated HLR serving that particular mobile station. By utilizing a relational database as shown in FIG. 10, the centralized database or the VHLR may determine the network address representing the HLR currently serving the ported mobile station. By indexing on the received MSISDN number, the network address can be ascertained and the request signal rerouted. The network address itself may be represented using basically four different formats: an E.164 number representing the HLR; an E.214 number representing a mobile global title number; an E.212 number representing an International Mobile Station Identification (IMSI) number; or the Destination Point Code/Subsystem Number (DPC/SSN) representing the HLR.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for retrieving subscriber information associated with a mobile station, said mobile station being ported from an original home location register (HLR) to a particular HLR, said particular HLR storing said subscriber information associated with said mobile station, said method comprising the steps of:

responsive to an incoming signal, transmitting a first signal identifying a mobile station identification number from a gateway node to a centralized database, said first signal requesting said subscriber information;

determining, by said centralized database, a network address representing said particular HLR by indexing on said mobile station identification number;

rerouting said first signal from said centralized database to said particular HLR using said determined network address;

retrieving said subscriber information in response to a reception of said first signal by said particular HLR; and transmitting a second signal from said particular HLR to said gateway node, said second signal including said retrieved subscriber information, and said second signal being addressed to said gateway node.

2. The method of claim 1 wherein said mobile station identification number comprises a Mobile Station Integrated Services Digital Network (MSISDN) number.

3. The method of claim 1 wherein said incoming signal comprises a Short Message Service (SMS) data signal.

4. The method of claim 3 wherein said gateway node comprises a Short Message System—Gateway Mobile Switching Center (SMS-GMSC) node.

5. The method of claim 4 wherein said incoming signal includes a translation type (TT) value, and wherein said step of transmitting said first signal to said centralized database further comprises the steps of:

testing for whether said TT value equals ten; and transmitting said first signal if said TT value equals ten (10).

6. The method of claim 1 wherein said subscriber information comprises a network address representing a Mobile Switching Center (MSC) currently serving said mobile station.

7. The method of claim 1 wherein said incoming signal comprises an incoming voice call.

8. The method of claim 7 wherein said gateway node comprises a Gateway Mobile Switching Center (GMSC) for routing said incoming voice call.

9. A system for routing an incoming signal to a mobile station, said mobile station being ported from an original home location register (HLR) to a particular HLR, said particular HLR storing subscriber information associated with said mobile station, said system comprising:

a mobile switching center (MSC) serving said mobile station, said particular HLR storing said subscriber information identifying said MSC;

a gateway node for receiving said incoming signal and transmitting a first signal requesting said subscriber information;

a centralized database for receiving said first signal and determining a network address of said particular HLR and rerouting said first signal using said network address from said centralized database to said particular HLR;

wherein said particular HLR retrieves said subscriber information and transmits a second signal including said subscriber information to said gateway node, said second signal being addressed to said gateway node; and wherein said gateway node responds to said network information received in said second signal by routing said incoming signal to said MSC as indicated by said subscriber information.

10. The system of claim 9 wherein said gateway node comprises a Short Message Service—Gateway Mobile Switching Center (SMS-GMSC) node.

11. The system of claim 10 wherein said first signal to said centralized database is transmitted only if said incoming signal comprises a Title Translation (TT) value of ten (10).

12. The system of claim 9 wherein said first signal comprises a Mobile Application Part (MAP) signal communicated over a Signaling System No. 7 (SS7).

13. The system of claim 9 wherein said centralized database stores:
   a first record containing an identification number for said mobile station;
   a second record containing said network address representing said particular HLR; and
   correlation data for correlating said first record with said second record.

14. The system of claim 13 wherein said network address comprises a Global Title (GT) translation address.

15. The system of claim 13 wherein said network address comprises a Destination Point Code (DPC) and a Subsystem Number (SSN).

16. The system of claim 9 wherein said first signal includes a Mobile Station Integrated Service Digital Network (MSISDN) number.

17. The system of claim 9 wherein said gateway node comprises a Gateway Mobile Switching Center (GMSC) node for handling incoming voice calls.

18. The system of claim 9 wherein said centralized database comprises a virtual home location register (VHLR).

19. A system for retrieving subscriber information associated with a mobile station, said mobile station being ported from an original home location register to a particular home location register (HLR), said particular HLR storing said subscriber information associated with said mobile station, said system comprising:
   responsive to an incoming signal, means for transmitting a first signal identifying a mobile station identification number from a gateway node to a centralized database, said first signal requesting said subscriber information;
   means for determining, by said centralized database, a network address representing said particular HLR using said mobile station identification number;
   means for rerouting said first signal from said centralized database to said particular HLR using said determined network address;
   means for retrieving said subscriber information in response to a reception of said first signal by said particular HLR; and
   means for transmitting a second signal from said particular HLR to said gateway node, said second signal including said retrieved subscriber information, and said second signal being addressed to said gateway node.

20. The system of claim 19 wherein said mobile station identification number comprises a Mobile Station Integrated Services Digital Network (MSISDN) number.

21. The system of claim 19 wherein said gateway node comprises a Short Message System—Gateway Mobile Switching Center (SMS-GMSC) node.

22. The system of claim 19 wherein said gateway node comprises a Gateway Mobile Switching Center (GMSC) for routing said incoming signal.

23. A method for retrieving subscriber information associated with a mobile station, said mobile station being ported from an original home location register (HLR) to a particular HLR, said particular HLR storing said subscriber information associated with said mobile station, said method comprising the steps of:
   responsive to an incoming signal, transmitting a first signal identifying a mobile station identification number from a gateway node to a centralized database, said first signal requesting said subscriber information, and said first signal having an originating address comprising an address for said gateway node and a destination address comprising an address for said centralized database;
   determining, by said centralized database, a network address representing said particular HLR by indexing on said mobile station identification number;
   forwarding said first signal from said centralized database to said particular HLR by replacing in said destination address of said first signal said network address of said particular HLR and maintaining said address for said gateway node as said originating address;
   retrieving said subscriber information from said particular HLR; and
   transmitting a second signal from said particular HLR to said gateway node, said second signal including said retrieved subscriber information, and said second signal having an originating address comprising said network address of said particular HLR and a destination address comprising said address of said gateway node as extracted from said originating address of said first signal.

24. The method of claim 23 wherein said mobile station identification number comprises a Mobile Station Integrated Services Digital Network (MSISDN) number.

25. The method of claim 23, wherein said incoming signal comprises a Short Message Service (SMS) data signal.

26. The method of claim 25 wherein said gateway node comprises a Short Message Service—Gateway Mobile Switching Center (SMS-GMSC) node.

27. The method of claim 26 wherein said incoming signal includes a translation type (TT) value, and wherein said step of transmitting said first signal to said centralized database further comprises the steps of:
   testing for whether said TT value equals ten; and
   transmitting said first signal if said TT value equals ten (10).

28. The method of claim 23 wherein said subscriber information comprises a network address representing a Mobile Switching Center (MSC) currently serving said mobile station.

29. The method of claim 23 wherein said incoming signal comprises an incoming voice call.

30. The method of claim 29 wherein said gateway node comprises a Gateway Mobile Switching Center (GMSC) for routing said incoming voice call.

31. A system for routing an incoming signal to a mobile station, said mobile station being ported from an original home location register (HLR) to a particular HLR, said particular HLR storing subscriber information associated with said mobile station, said system comprising:
   a mobile switching center (MSC) serving said mobile station, said particular HLR storing said subscriber information identifying said MSC;
   a gateway node for receiving said incoming signal and transmitting a first signal requesting said subscriber information;
   a centralized database for receiving said first signal and determining a network address of said particular HLR and forwarding said first signal using said network address from said centralized database to said particular HLR;

wherein said first signal has an originating address comprising an address for said gateway node and a destination address comprising an address for said centralized database;

wherein said centralized database forwards said first signal to said particular HLR by replacing in said destination address of said first signal said network address of said particular HLR and maintaining said address for said gateway node as said originating address;

wherein said particular HLR retrieves said subscriber information and transmits a second signal including said subscriber information to said gateway node, said second signal having an originating address comprising said network address of said particular HLR and a destination address comprising said address of said gateway node as extracted from said originating address of said first signal; and wherein said gateway node responds to said subscriber information received in said second signal by routing said incoming signal to said MSC as indicated by said subscriber information.

32. The system of claim 31 wherein said incoming signal comprises a Short Message Service (SMS) data signal.

33. The system of claim 32 wherein said gateway node comprises a Short Message Service—Gateway Mobile Switching Center (SMS-GMSC) node.

34. The system of claim 33 wherein said first signal to said centralized database is transmitted only if said incoming signal comprises a Title Translation (TT) value of ten (10).

35. The system of claim 31 wherein said first signal comprises a Mobile Application Part (MAP) signal communicated over a Signaling System No. 7 (SS7).

36. The system of claim 31 wherein said centralized database stores:

a first record containing an identification number for said mobile station;

a second record containing said network address representing said particular HLR; and correlation data for correlating said first record with said second record.

37. The system of claim 31 wherein said first signal includes a Mobile Station Integrated Service Digital Network (MSISDN) number.

38. The system of claim 31 wherein said gateway node comprises a Gateway Mobile Switching Center (GMSC) for handling incoming voice calls.

39. The system of claim 31 wherein said centralized database comprises a virtual home location register (VHLR).

* * * * *